United States Patent [19]

Bobsin et al.

[11] Patent Number: 4,482,997

[45] Date of Patent: Nov. 13, 1984

[54] ARRANGEMENT FOR REDUCING CLIPPING IN A DIGITAL CONFERENCE ARRANGEMENT

[75] Inventors: John H. Bobsin, Seoul, Rep. of Korea; Mohamed A. Marouf, Lisle, Ill.

[73] Assignee: AT&T Bell Laboratories, Murray Hill, N.J.

[21] Appl. No.: 382,762

[22] Filed: May 27, 1982

[51] Int. Cl.³ .............................................. H04M 3/56
[52] U.S. Cl. ................................... 370/62; 179/18 BC
[58] Field of Search ...................... 370/62; 179/18 BC

[56] References Cited

U.S. PATENT DOCUMENTS 3,883,697  5/1975  Brown ............................ 179/18 BC
4,000,377 12/1976  Sharret .......................... 179/18 BC
4,387,457  6/1983  Münter ................................. 370/62

OTHER PUBLICATIONS

"TASI-E Communications System", R. L. Easton, P. T. Hutchison, R. W. Kolor, R. C. Mondello, R. W. Muise, International Conf. on Comm., pp. 49.3.1–49.3.5.

Primary Examiner—Douglas W. Olms
Assistant Examiner—Kenneth I. Rokoff
Attorney, Agent, or Firm—R. J. Godlewski; C. H. Davis

[57] ABSTRACT

For use in a multichannel time division multiplexed conference arrangement where the samples in one time frame of simultaneous speakers are summed for distribution to each of the conferees, the disclosed arrangement reduces the amount of speech that is often not heard (clipped) when a conferee first begins to speak. The arrangement features a delay unit which stores all the speech samples from one time frame for a period of time greater than the processing time required to detect and determine whether to include speech samples from a new speaker in the distributed sample. By first storing the samples from one time frame and then summing the stored samples, any samples from a new speaker may be included in the resulting output sample to reduce speech clipping.

5 Claims, 3 Drawing Figures

ARRANGEMENT FOR REDUCING CLIPPING IN A DIGITAL CONFERENCE ARRANGEMENT

CROSS-REFERENCE TO RELATED APPLICATIONS

This application is related to the previously filed application of T. W. Anderson et al., entitled "Announcement System", Ser. No. 380,511, filed May 21, 1982; the concurrently filed applications of D. E. Herr et al., entitled "Automatic Interactive Conference Arrangement", Ser. No. 382,602, and M. A. Marouf et al., entitled "Method and Apparatus for Controlling Ports in a Digital Conference Arrangement, Ser. No. 382,672, filed May 27, 1982; and the subsequently filed applications of A. H. Bass et al., entitled "Method and Apparatus for Controlling Ports in a Digital Conference Arrangement", Ser. No. 437,693, M. A. Marouf et al., entitled "Method and Apparatus for Controlling Signal Level in a Digital Conference Arrangement", Ser. No. 437,740, and M. A. Marouf et al., entitled "Method and Apparatus for Improving the Quality of Communication in a Digital Conference Arrangement", Ser. No. 437,545, all filed Oct. 29, 1982. Two of these applications, Ser. Nos. 437,545 and 437,740, are continuation-in-part applications of the M. A. Marouf et al. application, Ser. No. 382,672, filed concurrently with this application May 27, 1982.

TECHNICAL FIELD

This invention relates generally to conference arrangements for including audio samples received from conference participants in an output sample. In a more particular aspect, the invention relates to digital conference arrangements for including any conferee sample received in a given time frame in an output sample to be distributed during a time interval subsequent to the given time frame.

BACKGROUND OF THE INVENTION

Generally, digital conference arrangements combine input samples such as, for example, a speech sample from each conference channel and then distribute the resulting output sample to each conferee. With such time division multiplexed arrangements, the quality of speech communication between conferees should approximate that of a two-party connection. However, this is generally not the case, because the conferees usually communicate with each other over various types of transmission facilities which introduce noise, echo, and other types of distortion.

One of the more common ways to reduce the distortion is to include only the speech samples from selected speakers in the resulting output sample. Typically, this is accomplished by including in the conference circuit a detector circuit to designate a channel which has speech samples above a threshold level which is usually somewhat higher than the level of noise on the transmission facility. In response, conference circuit switching hardware includes only speech samples from designated channels in the resulting output sample. Consequently, noise and other distortion from non-speaking conferees is eliminated from or, in effect, switched out of the distributed sample. However, some minimum response time is required to detect speech samples above the threshold and to select designated channels. Depending on the amount of delay, the response time may cause the first syllable or even the entire first word of a new speaker to be excluded or, more commonly, clipped from the output signal. Since speech clipping increases directly with the number of conferees, the need to reduce or eliminate the clipping associated with large numbers of conferees becomes more pronounced so as to maintain intelligible communication.

SUMMARY OF THE INVENTION

The foregoing problem is solved and a technical advance is achieved by an arrangement for assuring that an input audio sample from a designated channel is included in an output sample which is distributed to the channels. For use in a time division multiplexed conference arrangement having a plurality of channels wherein input audio samples are received in a first time frame and included in an output sample to be distributed to the channels during a time interval subsequent to the first time frame, the arrangement includes a detector circuit for generating a control signal designating each channel having an input sample above a predetermined threshold. Effective upon the receipt of the control signal, switching means in the arrangement includes in the output sample any input sample from a channel designated by the control signal. Delay means assures that a detected sample is included in the distributed sample by delaying the application of the input samples to the switching means until the control signal has been generated by the detector.

In one illustrative embodiment of the invention, switching hardware sums the speech samples received in a first time frame from a number of conference channels to form an output sample during a subsequent time interval. To assure that any detected speech sample is included in the output sample, a delay unit includes means for storing the input speech samples received in the first time frame and means for applying these samples to the switching hardware during the subsequent time interval.

In accordance with another feature of this invention, stored input samples are applied to the switching hardware after the control signal is received. The subsequent time interval includes a second and a third time frame. The control signal is generated during the second time frame, and the stored input samples are applied to the switching hardware during the third time frame.

BRIEF DESCRIPTION OF THE DRAWING

The invention may be better understood from the following detailed description when read with reference to the drawing in which.

DETAILED DESCRIPTION

INTRODUCTION

Figure 1:
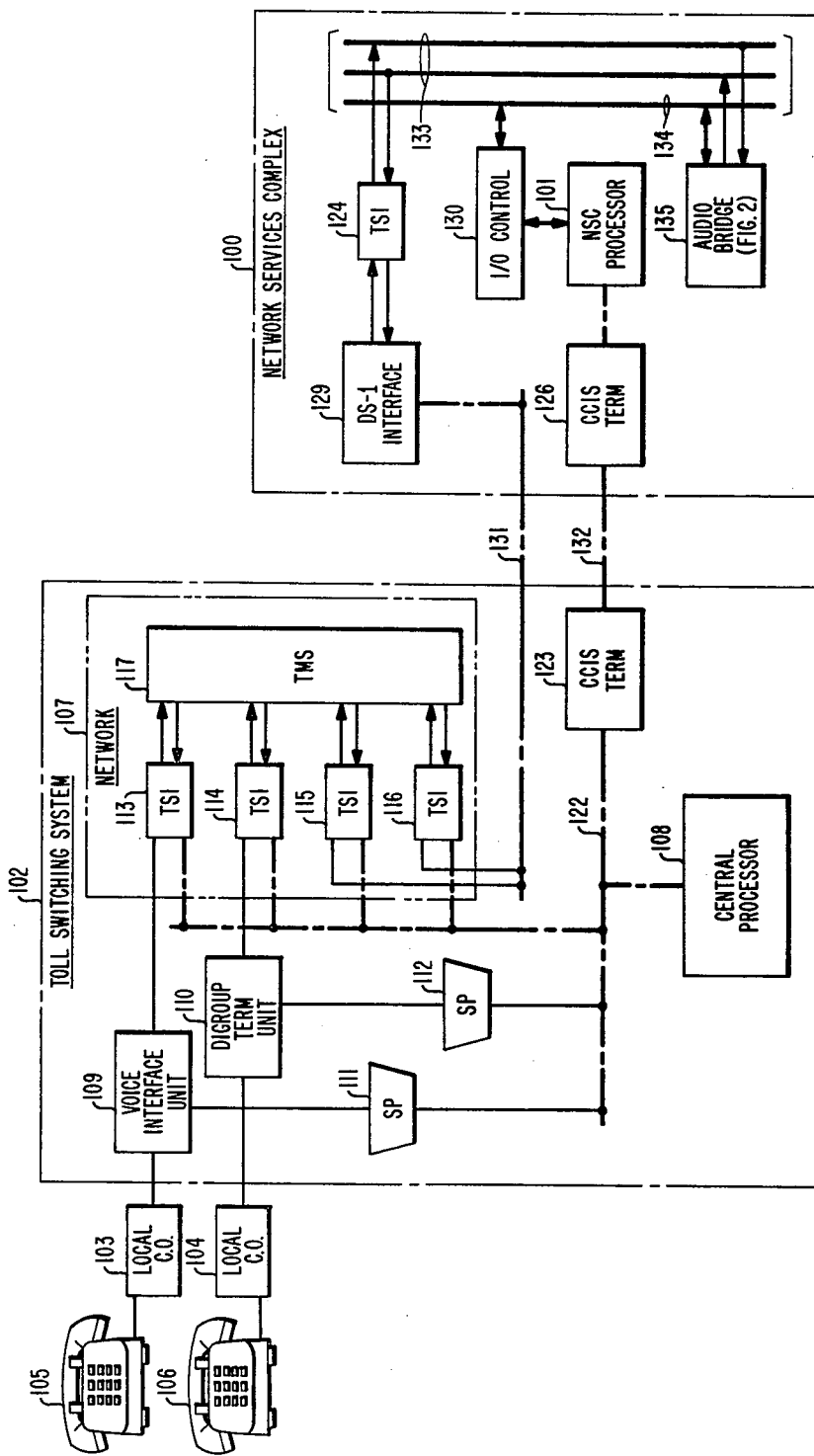
FIG. 1 shows a block diagram of a telephone network having a toll switching system equipped with a network services complex (NSC) for providing audio conferencing and other services.

The general organization of a system employing the invention is illustrated in the block diagram of FIG. 1 which shows a typical communications network having a toll switching system 102 which serves local central offices 103 and 104. Central offices 103 and 104 contain switching apparatus for providing communication services to customer stations 105 and 106, respectively. Connected to switching system 102 is network services complex 100 for providing special services such as audio and data conferencing.

Network services complex 100 includes NSC processor 101, audio bridge 135, and other units. As will be described in more detail below, one of the functions of the complex is to provide facilities for conferencing the voice signals of customers over the telephone network via the toll and local switching offices.

Toll switching system 102, as depicted in FIG. 1, is a typical electronic switching system, such as, the No. 4 ESS which is manufactured by the Western Electric Company, Incorporated. This switching system is described in detail in the *The Bell System Technical Journal*, Vol. 56, No. 7, September, 1977, and need not be fully described herein for the reader to understand the present invention.

TOLL SWITCHING SYSTEM

Switching system 102 comprises network 107, central processor 108, voice interface unit 109, digroup terminal unit 110, signal processors 111 and 112, and miscellaneous equipment units that have not been shown to simplify the drawing.

Network 107 has a time-space-time switching configuration utilizing time slot interchange (TSI) units 113–116 and time multiplex switch (TMS) unit 117.

Time multiplex switch 117 is a two-stage switch array comprised of solid state crosspoints which provide a multiplicity of unidirectional paths between its inputs and outputs. Each network connection through TMS 117 is made in terms of a pair of unidirectional paths in one of the 128 time slots sharing the paths on a repeating basis at an 8 KHz rate. The switches are controlled by information contained in time slot memories and this information is placed in the memory by the central processor under the control of call processing programs.

Time slot interchange units 113–116 provide the initial time-space and final space-time stages of network 107. The units receive incoming pulse code modulated (PCM) samples over analog and digital facilities in well-known DS-120 format where 120, eight-bit PCM channels are time division multiplexed with eight maintenance channels to form a 128 time slot frame. The receiving portion of a TSI unit buffers the incoming links to allow synchronization of the data with network timing and performs the initial time-space switching before transmitting the data to the TMS. After passing through the TMS, the data is returned to the same TSI or another TSI where the final space-to-time conversion is performed. The TSI then reloads the data onto outgoing DS-120 links where it is transmitted to the appropriate analog or digital facility.

Access to switching network 107 is via serial PCM links each accommodating 120 voice channels. However, central offices 103 and 104 can be connected to toll switching system 102 via analog or digital transmission facilities. Thus, as seen in FIG. 1, local central office 104 is connected to the toll office over digital facilities which terminate in digroup terminal unit 110, whereas local office 103 is connected via analog trunks to voice interface unit 109. Digroup terminal 110 performs the time division multiplexing and demultiplexing between interoffice transmission facilities and network 107 and also processes control signals from signaling processor 112.

The analog trunks are terminated in a voice interface unit such as 109 whose principal function is analog-to-digital conversion (and vice-versa) plus formating digital data for the TSI units. Voice interface unit 109 communicates with the central processor via signal processor 111.

Signal processor 111 is a directed processor under the control of central processor 108 and provides the scan, distribute, and digit reception tasks for analog trunks. Signal processor 112 performs the equivalent tasks for the digital trunks except that instead of physical scan and distribution points, the supervisory states of each trunk are stored in a memory of the signal processor.

The majority of the logic, control, storage, and translation functions required for the operation of the toll switching system are performed by central processor 108. A typical central processor suitable for use in the illustrative toll switching system is described in the *Bell System Technical Journal*, Vol. 56, No. 2, February, 1977.

As mentioned above, interoffice signaling information is extracted from the transmission paths of analog and digital trunks by signal processors 111 and 112, respectively, and used by central processor 108 for call processing. However, the signaling for certain trunks may be transmitted between the offices over a common data link separate from the transmission paths using a common channel interoffice signaling (CCIS) system. A typical common channel interoffice signaling system is described in *The Bell System Technical Journal*, Vol. 57, No. 2, dated February, 1978, and is depicted in FIG. 1 by CCIS terminal blocks 123 and 126 and data link 132.

NETWORK SERVICES COMPLEX

Coupled to the toll switching system is network services complex 100 comprising NSC processor 101, time slot interchange unit 124, DS-1 interface 129, input/output control 130, and audio bridge 135. Network services complex 100 also includes other units such as a data conferencing facility, dual tone multifrequency receivers, and data storage which have not been shown to simplify the drawing and which need not be fully described herein for the reader to understand the present invention.

It is intended that network services complex 100 function with many different types of switching systems to provide several special services in addition to those mentioned above. As such, complex 100 has been designed to connect to a switching system via conventional interoffice trunks and a CCIS like data link. Interoffice trunks 131 serving complex 100 are digital facilities such as, for example, well-known T1 type, which are similar to the trunks between toll office 102 and local office 103 as described above, and data link 132 along with CCIS terminals 123 and 126 which are similar to those described in the 1978 *Bell System Technical Journal* cited above.

The network services complex is modularly designed to allow for various service units to be added. All units are interconnected over a time-multiplexed data bus 133 and a serial control bus 134. The control bus is used by NSC processor 101 via I/O control 130 to communicate control, status, and error information with the various units in the complex. Input/output control 130 is a typical direct memory access circuit, whereas data bus 133 consists of a transmit and a receive leg, each handling 256 time slots of time-multiplexed PCM data.

Interface 129 connects interoffice trunks 131 from toll switching system 102 to time slot interchange unit 124 which switches any of the 128 or 256 time slots on the interoffice trunks and data bus 133, respectively.

The network services complex 100 is controlled by NSC processor 101 which performs all call processing, maintenance, fault recovery, diagnostics and audits for the entire complex. NSC processor 101 also interfaces with CCIS terminal 126 to transmit and receive messages from the host toll switching system 102.

As mentioned above, the network services complex can be equipped to furnish many services. For this illustrative embodiment, the complex is equipped with audio bridge 135 which will be used for establishing audio conferences under customer control.

THE AUDIO BRIDGE

Figure 2:
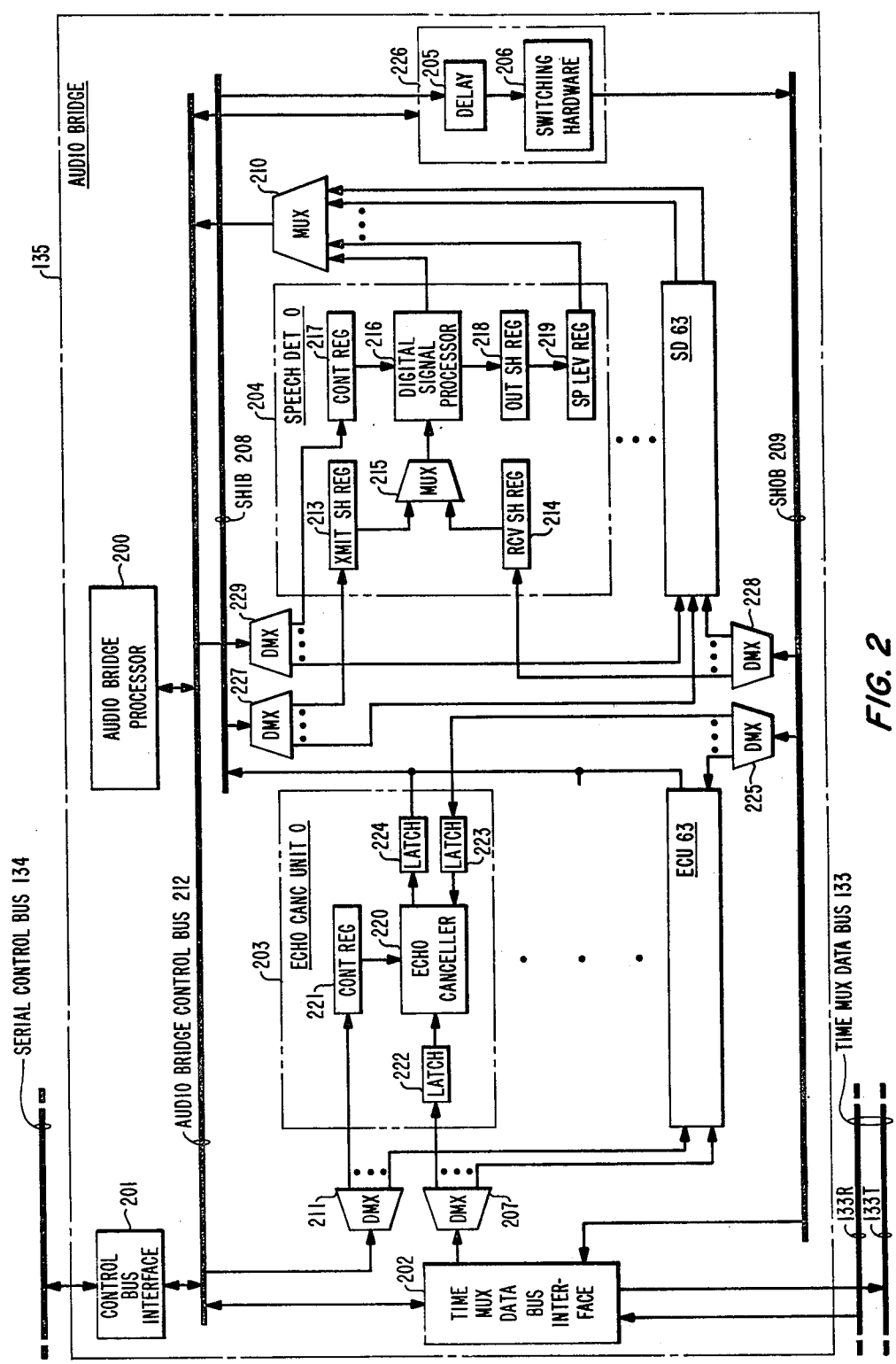
FIG. 2 shows a more detailed block diagram of the NSC audio bridge for providing audio conferences.

The audio bridge is a multichannel time division multiplexed conference arrangement and is illustrated in more detail in the block diagram of FIG. 2. The conference arrangement comprises an audio bridge processor 200, bus interfaces 201 and 202, a plurality of echo canceler units such as 203, a plurality of speech detectors such as 204, and logic unit 226 which includes delay unit 205 and switching hardware 206. A speech detector and an echo canceler are provided on a per-channel basis to detect and measure the level of speech and to control the amount of echo, respectively. In this illustrative embodiment, 64 detectors and 64 echo cancelers have been provided to make up a 64 channel (port, time slot) audio bridge, but only 60 will be available for conferencing with the others being used for spares and maintenance testing. Thus, the audio bridge can form conferences varying in size from one 60-channel conference to 20 three-channel conferences.

During each time frame, each channel is monitored for information (speech) samples above a threshold level. Upon detecting threshold level samples, the speech detector for that channel generates two control signals. One is a speech indication which designates the channel as having speech thereon, and the other is a speech level estimate which is used for channel selection and automatic level control. The audio bridge processor scans the speech detectors once each base cycle for these signals to direct the switching hardware to include only input samples from selected, designated ports in the output sample. With one conferee speaking, only the input sample from that speaker is included in the output sample. With more than one conferee speaking simultaneously, the switching hardware sums the input sample from each speaker together to form the output sample. To allow sufficient time for speech detection and channel selection, the delay unit stores all input samples received in a first time frame for a period of time equal to the worst case speech detection and channel selection time. Included in a subsequent time interval is a second and a third time frame. During the second time frame, the two control signals are generated. During the third time frame, the delay unit applies the stored input samples to the switching hardware for selective inclusion in an output sample.

Communication within the audio bridge between the audio bridge processor and other units is via audio bridge control bus 212. The audio bridge communicates with the rest of the network services complex, and, therefore, the telephone network via serial control bus 134 and time multiplexed data bus 133. It is over serial control bus 134 that the audio bridge receives orders from and sends replies to NSC processor 101 for establishing and controlling conferences. Time-multiplexed data bus 133, on the other hand, comprises a transmit and a receive leg for handling the samples of speech to be summed and distributed for each conference.

AUDIO BRIDGE PROCESSOR

Audio bridge processor 200 is a well-known 16 bit, bit-sliced microprogrammed controller that performs all common arithmetic, logic, and sequence control operations found in comparable 16 bit microcomputers. The audio bridge processor communicates with the NSC main processor via audio bridge control bus 212 and is programmed to scan the transmit and receiver buffers within serial control bus interface 201 for orders to control the conferences and to format replies to the NSC processor.

The audio bridge processor also controls the status of the conferences by writing control information into the switching hardware control memory. In addition, the processor also scans the speech detectors to obtain information about the speech level of every channel of the conference, maps the speech level into control data, and then writes the control data into the switching hardware control memory for noise control and automatic level control. Furthermore, processor 200 controls the operation of the echo canceler hardware by writing control data into the echo canceler control registers.

Although a member of well-known bit-sliced controllers may be used for audio bridge processor 200, a detailed description of a suitable audio bridge processor may be in the copending application of M. A. Marouf, et al., entitled "Method and Apparatus for Controlling Ports in a Digital Conference Arrangement", Ser. No. 382,672, filed concurrently with this application May 27, 1982.

ECHO CANCELER

As mentioned above, the echo canceler units are provided on a per-channel basis. Each unit comprises an echo canceler such as 220, a plurality of latches 222–224 for gating speech samples into and out of the echo canceler, and a control register 221 under the control of audio bridge processor 200.

An example of an echo canceler unit suitable for use in the echo canceler unit is described in "An Single-Chip VLSI Echo Canceler", *Bell System Technical Journal*, Vol. 59, No. 2, February, 1980, pp. 149–160. During its assigned time slot, the echo canceler receives a near-end speech sample from time-multiplexed data bus interface 202 via multiplexer 207 and latch 222 and a far-end speech sample from the switching hardware via multiplexer 225 and latch 223 in $\mu255$ companded format. Echo canceler 220 computes the estimated echo and subtracts this from the near-end speech sample. The resultant is transmitted via latch 224 to switching hardware input bus 208. The speech samples from the switching hardware are transmitted to the time slot interchange unit via time-multiplexed data bus 133 and interface 202.

The transmit and receive legs of the time multiplexed data bus 133 pass 256 time slots of PCM data to and from time slot interchange unit 124. The audio bridge channels need only 64 time slots. The interface selects the 64 out of 256 time slots required for the audio bridge channels, formats the data, and generates timing signals for the echo cancelers, speech detectors, delay unit, and switching hardware.

SPEECH DETECTOR

Speech detector 204 comprises a digital signal processor 216, two input shift registers 213 and 214, an output shift register 218, and speech level register (latch) 219. The speech detector does not modify the flow of data from the echo cancelers to the switching hardware but merely monitors the data flow on both the input and output sides, i.e., buses 208 and 209, of switching hardware 206 via demultiplexers 227 and 228. This gives the audio bridge processor full control over the gain or loss modification of the audio data and also permits the bridge to operate with some or all of the speech detectors out of service.

The digital signal processor 216 receives a synchronization pulse in the time slot to which the speech detector is assigned, and upon receiving the pulse, the speech detector starts alternately reading data from the switching hardware input and output buses 208 and 209 via shift registers 213 and 214, respectively, and multiplexer 215. In executing its program, the digital signal processor transmits a speech level measurement to output shift register 218 and latch 219. Periodically, the audio bridge processor scans the digital signal processor for a speech indication and, if present, reads the speech level measurement from the latch. This data is then transmitted over data bus 212 via multiplexer 210 which buffers data from all the speech detectors.

The audio bridge processor controls the digital signal processor 216 within the speech detector via control register 217. By setting register 217 via demultiplexer 229, the digital signal processor can be put in any one of a number of operational or maintenance modes.

An example of a digital signal processor suitable for use in the present invention is disclosed in the *Bell System Technical Journal*, Vol. 60, No. 7, Part 2, September, 1981.

SWITCHING HARDWARE

Switching hardware 206 performs three major functions in the conference arrangement, namely, it sums the speech samples from the time slots (channels) into their respective conferences to form an output sample for each conferee, implements noise and automatic level control on incoming speech samples, and implements echo control by switching loss into the speakers receive path when echo cancelers are not effective. The audio bridge processor controls these functions by writing the coefficient memory of the switching hardware with appropriate coefficients.

Insofar as the switching hardware is concerned conference summation is a two-step process which occurs over two time frames, where a frame comprises a maximum of 64 audio bridge time slots. The mouth samples for a given time frame are first combined to form a sum for each conference. Then, in the following time frame, an ear sample is produced for each conferee by subtracting the conferees mouth sample from the conference sum. This process allows for a pipelined architecture where the two operations occur concurrently but on two different time frames of data.

A detailed description of the switching hardware suitable for use in the present invention may be found in the aforementioned application of M. A. Marouf, et al. Ser. No. 382,672, filed concurrently with this application May 27, 1982.

DELAY UNIT

Delay unit 205 stores the information samples from all 64 channels for a period of time before the samples are applied to switching hardware 206. This provides enough time for the speech detectors to designate channels having threshold samples thereon and the audio bridge processor to select designated channels. If the delay unit is not utilized, the information samples would be applied directly to the switching hardware, and the loss of samples, commonly called clipping, would likely occur. When the samples represent speech, this clipping may result in the loss of the initial syllable or even the entire first word of a new speaker. In order to eliminate clipping, the delay time should be greater than the time required by the speech detector to detect threshold samples and the audio bridge processor to select designated channels.

Figure 3:
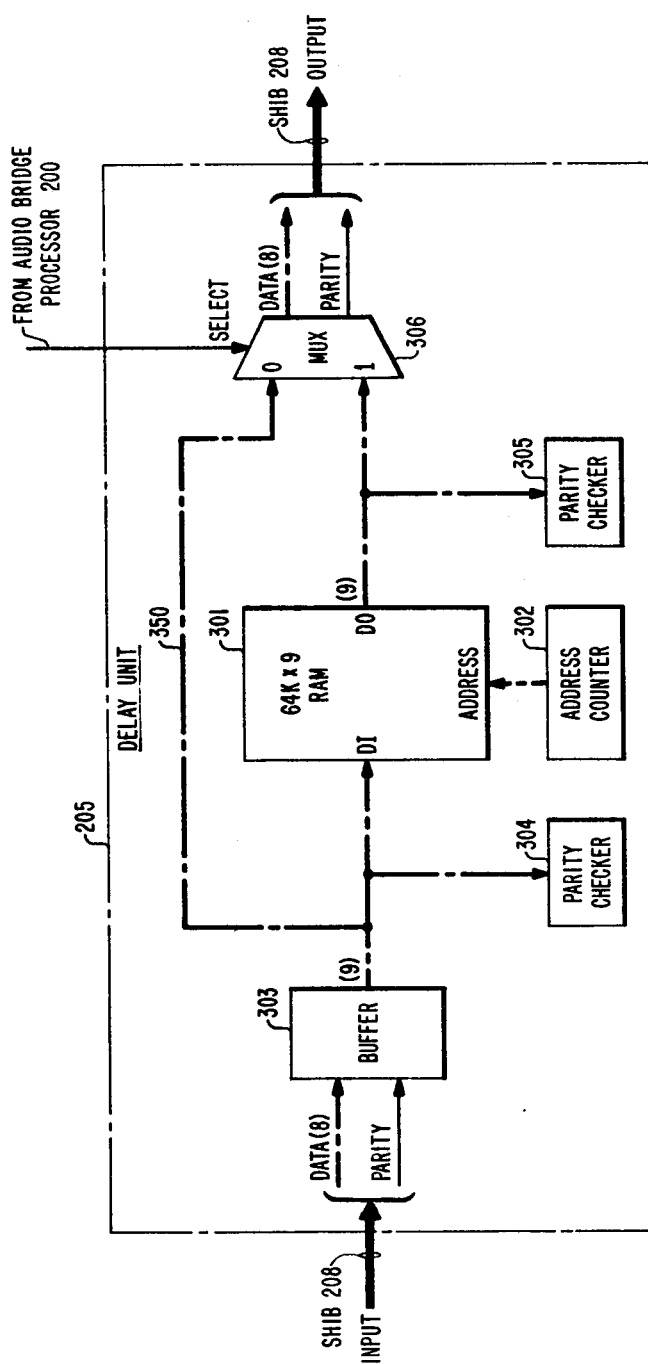
FIG. 3 shows a more detailed block diagram of the delay unit for including any conferee sample received in a given time frame in an output sample to be distributed to the conferees during a time interval subsequent to the given time frame.

The delay circuit used in this embodiment is depicted in more detail in FIG. 3 and comprises a delay memory such as RAM 301 and address counter 302. Delay memory 301 receives information samples from all 64 channels via switching hardware input bus 208 and input buffer 303. Each sample appears on the bus as eight parallel bits of PCM information during one time slot of a 64 time slot frame. In addition, a parity bit is provided with every input sample, and both are written into one location in delay memory 301 after parity is computed by input parity check circuit 304. During a subsequent time frame, the same sample and associated parity bit are read out during the same time slot the bits were written into memory. Parity is computed again for each sample by output parity circuit 305. During each of the 64 time slots, a read-write sequence is followed: reading old data out of a memory location, writing new data into the same location, and incrementing address counter 302.

One arrangement is to delay the sample a multiple of eight time frames (T1 format) where eight frames equals one millisecond of delay. Since there are 64 ports, it takes (8 times 64) 512 words of memory to delay a sample eight time frames. When, for example, the size of the delay memory is 64,024 words, the maximum delay is 127 milliseconds.

The length of delay can be controlled by adjusting the maximum value of the address counter. Since address counter 302 is incremented every time slot, the counter may be configured to cycle through 512 words of memory for one millisecond of delay. To provide k milliseconds of delay, the address counter is configured to cycle through k times 512 words of memory. If no delay is desired, a control signal from the audio bridge processor causes multiplexer 306 to select input samples directly from input buffer 303 via bypass bus 350.

To summarize, audio input samples from the channels are first stored in the delay memory during one time frame and then retrieved during a subsequent time frame for application to the switching hardware. This delay period allows the speech detectors and audio bridge processor sufficient time to detect threshold samples and select designated channels from which the switching hardware will include input samples in an output sample. In one case, the input samples and the control signal are received by the switching hardware during the same time frame. Alternatively, the input samples may be delayed a longer period of time to permit the control signals to be first received by the switching hardware. This allows time for the switching hardware to adjust the selected channels before receiving the input samples to avoid any possibility of clipping due to hardware response time. Once samples are applied to the switching hardware, conference summation is then a two-step process which occurs over two time frames, as previously described.

It is to be understood that the above described arrangement is merely an illustrative embodiment of the principles of the invention and that numerous other arrangements may be devised by those skilled in the art without departing from the spirit and scope of the invention. It is also to be understood that although the illustrative embodiment utilized a delay unit with a random access memory, any number of well-known arrangements could just as easily be used without departing from the spirit and scope of the invention.

What is claimed is:

1. For use in a time division multiplexed conference arrangement having a plurality of channels wherein input audio samples are received in a first time frame and included in an output sample to be distributed to the channels during a time interval subsequent to said first time frame, an arrangement for assuring that an input sample from a designated channel is included in said output sample comprising:
   detector means responsive to said input samples for generating a control signal designating each channel having an input sample above a predetermined threshold,
   switching means responsive to said control signal for including in said output sample any input sample received from a designated channel, and
   delay means operative independent of said control signal for delaying the application of said input samples to said switching means until said control signal has been generated by said detector means.

2. For use in a time division multiplexed conference arrangement having a plurality of channels wherein input audio samples are received in a first time frame and included in an output sample to be distributed to the channels during a time interval subsequent to said first time frame, an arrangement for assuring that a designated sample from said input samples is included in said output sample comprising:
   detector means responsive to said input samples for generating a control signal designating each of said input samples above a predetermined threshold,
   switching means responsive to said control signal for including in said output sample any of said input samples designated by said control signal, and
   delay means operative independent of said control signal for delaying the application of said input samples to said switching means until said control signal has been generated by said detector means.

3. An arrangement in accordance with claim 1 or 2 in which said time interval comprises a second and a third time frame, said detector means generates a control signal during said second time frame, and said delay means delays the application of said input samples to said switch means until said third time frame.

4. An arrangement in accordance with claim 3 in which said delay means comprises means for storing any of said input samples and means for retrieving said stored input samples to be included in said output sample.

5. For use in a time division multiplexed conference arrangement having a plurality of channels for receiving a plurality of audio input samples, an arrangement for assuring that at least one of said input samples received during a first time interval from designated of said channels is included in an output sample for distribution to said channels during a time interval subsequent to said first time frame comprising:
   a plurality of detector means each associated with one of said channels and responsive to said input samples for generating a control signal designating each of said channels having at least one of said input samples above a predetermined threshold during said first time frame.
   switching means responsive to said control signal for including in said output sample any of said input samples received from said designated channels during said first time frame, and
   delay means operative independent of said control signal for delaying the application of said input samples received from said channels during said first time frame to said switching means until said control signal has been generated by said detector means.

* * * * *